(12) United States Patent
Liu et al.

(10) Patent No.: US 6,903,169 B1
(45) Date of Patent: Jun. 7, 2005

(54) LTMC POLYMERIZATION OF UNSATURATED MONOMERS

(75) Inventors: Jia-Chu Liu, Mason, OH (US); Shao-Hua Guo, Exton, PA (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/748,582

(22) Filed: Dec. 30, 2003

(51) Int. Cl.$^7$ .................................................. C08F 4/44
(52) U.S. Cl. .................... 526/141; 526/317.1; 526/319; 526/344; 526/291; 526/332; 526/159
(58) Field of Search .............................. 526/141, 317.1, 526/319, 344, 291, 332, 159

(56) References Cited

U.S. PATENT DOCUMENTS

| | | | |
|---|---|---|---|
| 4,404,344 A | 9/1983 | Sinn et al. ................... 526/160 |
| 4,431,788 A | 2/1984 | Kaminsky ................... 527/313 |
| 4,990,640 A | 2/1991 | Tsutsui et al. ............... 556/181 |
| 5,153,157 A | 10/1992 | Hlatky et al. ................ 502/117 |
| 5,198,401 A | 3/1993 | Turner et al. ................ 502/155 |
| 5,241,025 A | 8/1993 | Hlatky et al. ................ 526/129 |
| 5,414,180 A | 5/1995 | Geerts et al. ................ 585/525 |
| 5,543,377 A | 8/1996 | Tsutsui et al. .............. 502/125 |
| 5,648,440 A | 7/1997 | Sugano et al. .............. 526/132 |
| 5,714,556 A | 2/1998 | Johnson et al. ............. 526/135 |
| 5,866,663 A | 2/1999 | Brookhart et al. .......... 526/170 |
| 5,955,555 A | 9/1999 | Bennett ...................... 526/133 |
| 6,127,497 A | 10/2000 | Matsunaga et al. ......... 526/141 |
| 6,174,975 B1 * | 1/2001 | Johnson et al. ............. 526/172 |
| 6,211,311 B1 | 4/2001 | Wang et al. ................. 526/131 |
| 6,340,771 B1 | 1/2002 | Hoang et al. ............... 556/171 |
| 6,620,759 B2 * | 9/2003 | Johnson et al. ............. 502/129 |
| 6,693,154 B2 | 2/2004 | Liu et al. .................... 526/134 |

* cited by examiner

*Primary Examiner*—William K. Cheung
(74) *Attorney, Agent, or Firm*—Shao-Hua Guo

(57) ABSTRACT

A process for polymerizing unsaturated monomers is disclosed. The process comprises polymerizing, in the presence of a late transition metal catalyst (LTMC), a variety of unsaturated monomers which are traditionally, some of which are exclusively, made by free radical polymerizations. The LTMC polymerization provides the polymer with improved properties such as no free radical residue and narrow molecular weight distribution.

16 Claims, No Drawings

LTMC POLYMERIZATION OF UNSATURATED MONOMERS

FIELD OF THE INVENTION

The invention relates to polymerization of unsaturated monomers. More particularly, the invention relates to polymerization of unsaturated monomers with late transition metal catalysts (LTMC).

BACKGROUND OF THE INVENTION

Chain polymerization of unsaturated monomers can be divided into free radical, ionic, and coordination polymerizations. Ionic polymerization includes anionic and cationic polymerizations. Cationic polymerization is usually initiated by the Lewis acids such as $BF_3$. Polyisobutylene rubber is the commercially important polymer made by the cationic polymerization. Anionic polymerization is usually initiated by alkyllithiums such as n-BuLi. Many anionic polymerizations are devoid of any termination reaction, and they are thus called "living" polymerization. Living anionic polymerization has led to the creation of thermoplastic elastomers such as SBS (styrene-butanediene-styrene block copolymers).

Coordination polymerization includes the Ziegler-Natta polymerization and the metallocene or single-site polymerization. The Ziegler-Natta polymerization is performed with zirconium or titanium salts, such as $TiCl_4$, $ZrCl_4$, and $VCl_4$, as catalysts and alkyl aluminum compounds, such as trimethyl aluminum, as cocatalysts. Metallocene catalyst was discovered by Kaminsky in the early 1980's (see U.S. Pat. Nos. 4,404,344 and 4,431,788). Metallocene catalyst comprises a transition metal complex that has one or more cyclopentadienyl (Cp) ligands. Unlike the Ziegler-Natta catalysts which have multiple active sites of polymerization, metallocene catalysts have only "single" polymerization site, and therefore they are called "single-site" catalysts. Many non-metallocene single-site catalysts have also been developed over the past decade.

Among the chain polymerizations, free radical polymerization is the most widely used in the polymer industry. Commonly used free radical initiators include peroxides, azo compounds, and persulfates. Unlike ionic initiators or coordination catalysts which require restricted conditions such as moisture and impurity free reaction systems, free radical polymerization can readily tolerate moisture and impurities. More importantly, free radical polymerization can tolerate functional monomers such as hydroxyl, carboxyl, and amino monomers. Thus, free radical polymerizations are exclusively used for making hydroxyl acrylic resins, polyacrylic acid, olefin-acrylic copolymers, and many other functional polymers.

Since the late 1990s, olefin polymerization catalysts that incorporate late transition metals (especially iron, nickel, or cobalt) and bulky α-diimine ligands (or "bis(imines)") have been investigated. These late transition metal catalysts (LTMC) are of interest because, unlike the early transition metal metallocenes or Ziegler catalysts, the LTMC can incorporate alkyl acrylate comonomers into polyolefins. See U.S. Pat. Nos. 5,866,663 and 5,955,555.

However, the LTMC is considered to be a coordination catalyst, and thus study on LTMC has been limited to olefin-related polymerizations. No prior art discloses the use of LTMC for making hydroxyl acrylic resins, styrene-allyl alcohol copolymers, and many other important functional polymers. No prior act discloses the use of LTMC for the polymerization of unsaturated monomers in the absence of olefins.

Compared to conventional free radical polymerization, the LTMC has great potential in tailoring of critical polymer properties: molecular weight, crystallinity or melting point, and polydispersity. Therefore, the LTMC may provide better product quality and production consistency. Also, the LTMC does not require high temperature and high pressure polymerization. It avoids the use of explosive peroxides or azo compounds. Thus, the LTMC polymerization may provide a safer and more cost-effective alternative to the existing free radical technology.

In summary, it is apparently important to explore the use of LTMC for the polymerization of the unsaturated monomers which have been traditionally, some of which have been exclusively, polymerized by free radical polymerizations.

SUMMARY OF THE INVENTION

The process of the invention comprises polymerizing unsaturated monomers in the presence of a late transition metal catalyst (LTMC). The LTMC comprises a Group 8–10 late transition metal complex and an activator. By "complex," we mean the compounds which comprise a Group 8–10 metal and at least one polymerization-stable ligand which remains bound to the metal during the course of the polymerization process.

The process includes polymerizing one of the monomer groups (a) through (f): (a) a vinyl monomer selected from the group consisting of vinyl aromatics, vinyl ethers, vinyl esters, and vinyl halides; (b) a vinyl monomer selected from the group consisting of vinyl ethers, vinyl esters, and vinyl halides, and at least one olefin; (c) a hydroxy-functional monomer selected from the group consisting of hydroxyalkyl acrylates, hydroxyalkyl methacrylates, allylic alcohols, and alkoxylated allylic alcohols, and at least one alkyl or aryl acrylate or at least one alkyl or aryl methacrylate; (d) a hydroxy-functional monomer selected from the group consisting of hydroxyalkyl acrylates, hydroxyalkyl methacrylates, allylic alcohols, and alkoxylated allylic alcohols, at least one alkyl or aryl acrylate or at least one alkyl or aryl methacrylate, and at least one olefin; (e) a hydroxy-functional monomer selected from the group consisting of hydroxyalkyl acrylates, hydroxyalkyl methacrylates, allylic alcohols, and alkoxylated allylic alcohols, and at least one vinyl aromatic monomer; or (f) a hydroxy-functional monomer selected from the group consisting of hydroxyalkyl acrylates, hydroxyalkyl methacrylates, allylic alcohols, and alkoxylated allylic alcohols, at least one vinyl aromatic monomer, and at least one olefin.

DETAILED DESCRIPTION OF THE INVENTION

The process of the invention is polymerizing unsaturated monomers with a late transition metal catalyst (LTMC). The LTMC comprises a Group 8–10 late transition metal complex and an activator. Suitable LTMC include those known in the art.

Preferred late transition metal complexes have the general structure:

The M is a Group 8–10 late transition metal. Preferably, the M is selected from the group consisting of Ni, Co, and Fe. More preferably, the M is Ni or Fe. Most preferably, the M is Fe.

The L is a polymerization-stable ligand. By "polymerization-stable ligand," we mean that the ligand remains bound to the metal during the course of the polymerization process. Preferably, the L is an isoindoline or bis(imine).

Suitable L ligands also include those taught by U.S. Pat. Nos. 5,714,556 and 6,620,759, the teachings of which are herein incorporated by reference.

The X is a labile ligand. By "labile ligand," we mean that the ligand is easily displaceable during the polymerization. Preferably, L is independently selected from the group consisting of hydrogen and halides, and n, the number of the X ligands, is greater than or equal to 1.

Suitable isoindoline ligands include those taught by co-pending appl. Ser. No. 09/947,745, filed on Sep. 6, 2001, the teachings of which are herein incorporated by reference. Preferably the isoindoline ligands have the general structure:

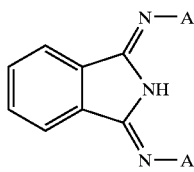

When forming a late transition metal complex, the hydrogen of the N—H group may be removed to form an ionic bonding between the nitrogen and the late transition metal. Optionally the aromatic ring hydrogen atoms of the above structure are independently substituted. Suitable ring substitute groups include alkyl, aryl, aralkyl, alkylayl, silyl, halogen, alkoxy, aryloxy, siloxy, nitro, dialkyl amino, diaryl amino groups, and the like.

A is an aryl or a heteroaryl group, When A is aryl, it preferably is phenyl- or alkyl-substituted, such as 4-methylphenyl or 2,4,6-trimethylphenyl (2-mesityl). When A is heteroaryl, it is preferably 2-pyridyl, 2-pyrimidinyl, 4-pyrimidinyl, 2-pyrazinyl, 2-imidazolyl, 2-thiazolyl, or 2-oxazolyl. The aryl and heteroaryl groups can be fused to other rings, as in a 2-naphthyl, 2-benzothiazolyl or 2-benzimidazolyl group. A few exemplary isoindolines appear below:

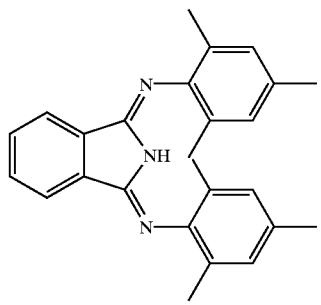

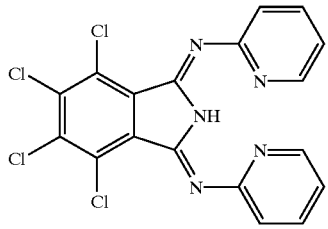

-continued

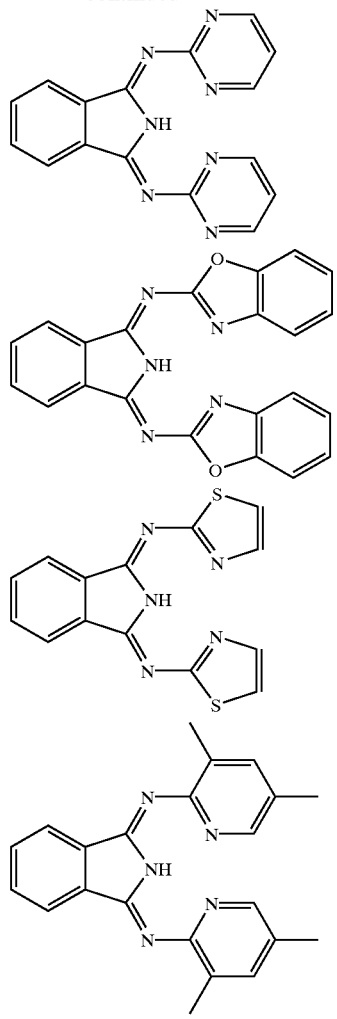

Suitable bis(imine) ligands include those taught by U.S. Pat. No. 5,866,663. Suitable bis(imine) ligands include those having the general structure:

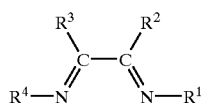

wherein $R^1$ and $R^4$ are each independently hydrocarbyl or substituted hydrocarbyl. $R^2$ and $R^3$ are each independently hydrogen, hydrocarbyl, substituted hydrocarbyl or $R^2$ and $R^3$ taken together are hydrocarbylene or substituted hydrocarbylene to form a ring.

Suitable bis(imine) ligands include those having the general structure:

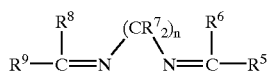

$R^5$ is hydrocarbyl or substituted hydrocarbyl, and $R^6$ is hydrogen, hydrocarbyl or substituted hydrocarbyl, or $R^5$ and $R^6$ taken together form a ring. $R^9$ is hydrocarbyl or substituted hydrocarbyl, and $R^8$ is hydrogen, substituted hydrocarbyl or hydrocarbyl, or $R^9$ and $R^8$ taken together form a ring. Each $R^7$ is independently hydrogen, substituted hydrocarbyl or hydrocarbyl, or two of $R^7$ taken together form a ring; n is 2 or 3.

Suitable bis(imine) ligands include 2,6-pyridinecarboxaldehydebis (imines) and 2,6-diacylpyridinebis(imines), which are taught, e.g., by U.S. Pat. No. 5,955,555. The teachings of U.S. Pat. No. 5,955,555 are incorporated herein by reference.

Suitable bis(imine) ligands also include acenaphthene bis-N,N'-(2,6-diisopropylphenyl)imines, which are taught, e.g., by U.S. Pat. No. 6,127,497. The teachings of U.S. Pat. No. 6,127,497 are incorporated herein by reference.

Suitable activators include alumoxane and alkylaluminum compounds. Examples of suitable alumoxane compounds include methyl alumoxane (MAO), polymeric MAO (PMAO), ethyl alumoxane, diisobutyl alumoxane, and the like. Examples of suitable alkylaluminum compounds include triethylaluminum, diethyl aluminum chloride, trimethylaluminum, triisobutyl aluminum, and the like. Suitable alumoxane compounds also include those that are modified. Methods for the modification of alumoxanes are known. For instance, U.S. Pat. No. 4,990,640 teaches the modification of alumoxanes with active hydrogen-containing compounds such as ethylene glycol. U.S. Pat. No. 6,340,771 teaches modifying MAO with sugar to make "sweet" MAO. Also, U.S. Pat. No. 5,543,377 teaches modifying alumoxanes with ketoalcohols and β-diketones. The teachings of these U.S. patents are incorporated herein by reference.

Suitable activators also include acid salts that contain non-nucleophilic anions. These compounds generally consist of bulky ligands attached to boron or aluminum. Examples include lithium tetrakis(pentafluorophenyl) borate, lithium tetrakis-(pentafluorophenyl) aluminate, anilinium tetrakis(pentafluorophenyl)borate, and the like.

Suitable activators further include organoboranes, which are compounds of boron and one or more alkyl, aryl, or aralkyl groups. Suitable organoboranes include substituted and unsubstituted trialkyl and triarylboranes such as tris (pentafluorophenyl)borane, triphenylborane, tri-n-octylborane, and the like. Suitable organoborane activators are described in U.S. Pat. Nos. 5,153,157, 5,198,401, and 5,241,025. The teachings of these U.S. patents are incorporated herein by reference. Suitable activators also include aluminoboronates, which are the reaction products of alkyl aluminum compounds and organoboronic acids. These activators are described in U.S. Pat. Nos. 5,414,180 and 5,648,440, the teachings of which are incorporated herein by reference.

The late transition metal complex, the activator, or both are optionally supported onto an inorganic solid or organic polymer support. Suitable supports include silica, alumina, silica-aluminas, magnesia, titania, clays, zeolites, or the like. The support is preferably treated thernally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150° C. to about 600° C., prior to use. A variety of different chemical treatments can be used, including reaction with organo-aluminum, -magnesium, -silicon, or -boron compounds. See, for example, the techniques described in U.S. Pat. No. 6,211, 311.

The invention includes a process for polymerizing, in the presence of the LTMC, a vinyl monomer selected from the group consisting of vinyl aromatics, vinyl ethers, vinyl esters, vinyl halides, the like, and mixtures thereof. Surprisingly, we found that these vinyl monomers, which are traditionally polymerized by free radical polymerization, can be readily polymerized by the LTMC without the presence of any olefin comonomer.

Suitable vinyl aromatic monomers preferably have a —CR'=CH$_2$ group connected to an aromatic group. R' is hydrogen or a C$_1$ to C$_{10}$ alkyl group. Examples of suitable vinyl aromatic monomers are styrene, α-methylstyrene, p-methylstyrene, p-t-butylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo4-trifluoromethylstyrene, 4-fluoro-3-trifluoromethylstyrene, 9-vinylanthracene, 2-vinylnaphthalene, the like, and mixtures thereof. Styrene is particularly preferred.

Suitable vinyl ethers include vinyl alkyl ethers, vinyl aryl ethers, and mixtures thereof. Examples of suitable vinyl alkyl ethers are methyl vinyl ether, ethyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, dimethylaminoethyl vinyl ether, diethylaminoethyl vinyl ether, butylaminoethyl vinyl ether, benzyl vinyl ether, tetrahydrofurfuryl vinyl ether, and the like, and mixtures thereof. Examples of suitable vinyl aryl ethers are vinyl phenyl ether, vinyl tolyl ether, vinyl chlorophenyl ether, vinyl-2,4-dichlorophenyl ether, vinyl naphthyl ether, vinyl anthranyl ether, the like, and mixtures thereof.

Suitable vinyl esters include vinyl acetate, vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl-β-phenylbutyrate, vinyl cyclohexylcarboxylate, vinyl benzoate, vinyl salicylate, vinyl chlorobenzoate, vinyl tetrachlorobenzoate, and vinyl naphthoate, the like, and mixtures thereof.

Suitable vinyl halides include by halogen substituted ethylenes. Examples are vinyl chloride, vinyl fluoride, vinylidene chloride, chlorotrifluoro ethylene, the like, and mixtures thereof.

The invention includes a process for polymerizing an olefin and a vinyl monomer selected from the group consisting of vinyl ethers, vinyl esters, vinyl halides, the like, and mixtures thereof. Suitable vinyl ethers, vinyl esters and vinyl halides are discussed above. Suitable olefins include α-olefins, cyclic olefins, and mixtures thereof. C$_2$–C$_{10}$ α-olefins are preferred. Ethylene, propylene, 1-butene, 1-pentene, 1-hexene, 1-octene, and mixtures thereof are particularly preferred. Ethylene and propylene are most preferred.

The invention includes a process for polymerizing a hydroxy-functional monomer selected from the group consisting of hydroxyalkyl acrylates, hydroxyalkyl methacrylate, allylic alcohols, alkoxylated allylic alcohols, and mixtures thereof, and an alkyl or aryl acrylate or an alkyl aryl methacrylate.

Suitable hydroxyalkyl acrylates and methacrylates include hydroxyethyl acrylate and methacrylate, hydroxypropyl acrylate and methacrylate, and hydroxybutyl acrylate and methacrylate. Suitable allylic alcohols and alkoxylated allylic alcohols include allyl alcohol, methallyl alcohol, ethoxylated allyl alcohol, ethoxylated methallyl alcohol, propoxylated allyl alcohol, and propoxylated methallyl alcohol. Suitable alkyl or aryl acrylates and methacrylates include $C_1$–$C_{20}$ alkyl acrylates and methacrylates, $C_6$–$C_{20}$ aryl acrylates and methacrylates, the like, and mixtures thereof. Examples are n-butyl acrylate, n-butyl methacrylate, methyl methacrylate, t-butyl methacrylate, iso-butyl methacrylate, benzyl methacrylate, cyclohexyl methacrylate, the like, and mixtures thereof.

The invention includes a process for polymerizing a vinyl aromatic and a hydroxy-functional monomer selected from the group consisting of hydroxyalkyl acrylates, hydroxyalkyl methacrylates, allylic alcohols, alkoxylated allylic alcohols, and mixtures thereof. Suitable hydroxyalkyl acrylates and methacrylates, allylic alcohols, alkoxylated allylic alcohols, and vinyl aromatics are discussed above.

The invention also includes a process for polymerizing an olefin, a vinyl aromatic, and a hydroxy-functional monomer selected from the group consisting of hydroxyalkyl acrylates, hydroxyalkyl methacrylates, allylic alcohols, alkoxylated allylic alcohols, and mixtures thereof. Suitable olefins, hydroxyalkyl acrylates and methacrylates, allylic alcohols, alkoxylated allylic alcohols, and vinyl aromatics are discussed above.

The polymerization of the invention is preferably conducted at a temperature within the range of about 0° C. to about 200° C. The polymerization temperature varies depending on the polymers to be made. For example, making hydroxyl acrylic resins or styrene-allyl alcohol copolymers requires a relatively high temperature (from about 80° C. to about 150° C. is preferred). High polymerization temperatures lead to low molecular weight resins which are suitable for high solids or low VOC (volatile organic compound) coatings.

The polymerization can be performed in bulk, solution, slurry, or any other suitable forms, depending on the polymers to be made. For instance, when a styrene-allyl alcohol copolymer is made, a bulk polymerization is preferred because allyl alcohol polymerizes slowly and the excess allyl alcohol functions as a solvent to control the polymerization. When a hydroxyl acrylic resin is made from an hydroxyalkyl acrylate and alkyl acrylate, the polymerization is preferably performed in solution wherein the solvent is used as a chain transfer agent to lower the polymer molecular weight and to control the polymerization rate.

The polymerization can be performed in a batch, semi-batch, or continuous process depending on the monomers used and the polymers made. For instance, a semi-batch process is preferred when a styrene-allyl alcohol copolymer is made. In the semi-batch process, allyl alcohol is initially charged into the reactor, and styrene is gradually fed into the reactor during the polymerization. The gradual addition of styrene ensures an even distribution of the OH function groups along the polymer chain.

The invention includes the polymers made by the process of the invention. Particularly interesting polymers include hydroxyl acrylic resins (i.e., copolymers comprise hydroxyl-functional monomers, alkyl or aryl acrylates or alkyl or acryl methacrylates, and optionally vinyl aromatics), olefin-acrylic copolymers, olefin-vinyl ester copolymers, and vinyl aromatic-allylic alcohol copolymers. The polymers made by the invention differ from the polymers made by the free radical polymerization in that the polymers of the invention do not contain residual free radical initiators or fragments from the initiator decomposition. Polymers made by free radical polymerization are thermally, chemically, or photochemically instable because of the residual initiator or initiator fragments. Thus, the polymers of the invention are expected to have improved thermal, chemical, and photochemical resistance.

The invention also includes articles made from the polymers of the invention. Examples of the useful articles which can be made from the polymers of the invention include films, sheets, containers, pipes, fibers, coatings, adhesives, elastomers, sealants, and the likes. One advantage of the invention is that the LTMC provide better tailoring than the free radical polymerization in controlling the polymer properties such as density, molecular weight, and molecular weight distribution. For instance, the LTMC polymerization can provide hydroxyl acrylic resins with narrow molecular weight distribution. The narrow molecular weight distribution results in lower VOC or higher solids coatings.

The following examples merely illustrate the invention. Those skilled in the art will recognize many variations that are within the spirit of the invention and scope of the claims.

EXAMPLE 1

Copolymerization of Ethylene, n-Butyl Acrylate, and Allyl Monopropoxylate with Iron(II) 1,3-Bis(2-Mesitylimino)isoindoline Complex and Mao Activator Catalyst Complex Preparation A 100-mL round-bottom flask equipped with a nitrogen inlet and an internal fritted-glass filter is charged with phthalimide (2.94 g, 20.0 mmol) and ethyl acetate (60 mL). 2,4,6-Trimethylaniline (5.41 g, 40.0 mmol, 2.0 eq.) and iron(II) chloride (2.54 g, 20.0 mmol) are added to the flask, and the mixture is stirred under nitrogen at room temperature for 1 h. The yellow mixture is heated to reflux (77° C.) for 10 h, and is then stirred at room temperature for 32 h. A brown precipitate forms. The reaction mixture is concentrated by stripping out the ethyl acetate under a stream of nitrogen. Cold diethyl ether (30 mL) is added to the residue, and the mixture is stirred to wash the residue. The glass filter is immersed in the liquid phase, which is then removed at reduced pressure through the internal filter. The solids are dried under vacuum for 2 h to give a brown powder.

Polymerization

The polymerization is performed in an Endeavor (Advantage™ Series 3400 Process Chemistry Workstation, made by Argonaut Technologies, Inc.). The Endeavor contains eight pressure reactor tubes each with individual temperature, pressure, stirring, and injection controls. The Endeavor is placed in a glove box for manual manipulations and an inert atmosphere of nitrogen. A pre-programmed computer monitors and collects data on pressure, temperature, ethylene consumption in each reactor tube as a function of the reaction time.

A reactor tube (10 mL) is charged with n-butyl acrylate (2 mL), allyl monopropoxylate (2 mL), tri-isobutyl aluminum (0.1 mL, 1.0 M hexane solution), MAO (0.08 mL, 1.0 M toluene solution), and the catalyst complex (0.2 mL, 1.0 mg/ml toluene solution). The reactor tube is then sealed. The reactor is pressured with ethylene to 400 psig and heated to 100° C. The polymerization continues at these temperature and pressure readings for about 1 h with continuous feeding of ethylene. The ethylene consumption is about 0.02 g. After polymerization, the unreacted monomers are removed by vacuum, yielding 0.4 g of polymer. The polymer has Mw: 5650; Mn: 3220; and Mw/Mn: 1.75.

EXAMPLE 2

Copolymerization of Ethylene, n-Butyl Acrylate, and Hydroxyethyl Acrylate with Iron(II) 1,3-Bis(2-Mesitylimino)isoindoline Complex and Mao Activator The general procedure of Example 1 is followed. A reactor tube (10 mL) is charged with n-butyl acrylate (2 mL), hydroxyethyl acrylate (2 mL), tri-isobutyl aluminum (0.1 mL, 1.0 M hexane solution), MAO (0.08 mL, 1.0 M toluene solution), and the catalyst complex (0.2 mL, 1.0 mg/ml toluene solution). The reactor tube is then sealed. The reactor is pressured with ethylene to 400 psig and heated to 100° C. The polymerization continues at these temperature and pressure readings for about 1 h with continuous feeding of ethylene. The ethylene consumption is about 0.2 g. After polymerization, unreacted monomers are removed by vacuum, yielding 2.2 g of polymer.

EXAMPLE 3

Copolymerization of n-Butyl Acrylate and Allyl Monopropoxylate with Iron(II) 1,3-Bis(2-Mesitylimino)isoindoline Complex and Mao Activator The general procedure of Example 1 is followed. A reactor tube (10 mL) is charged with n-butyl acrylate (2 mL), allyl monopropoxylate (2 mL), tri-isobutyl aluminum (0.1 mL, 1.0 M hexane solution), MAO (0.08 mL, 1.0 M toluene solution), and the catalyst complex (0.2 mL, 1.0 mg/ml toluene solution). The reactor tube is then sealed. The reactor contents are heated to 100° C. The polymerization continues at this temperature reading for about 1 h. After polymerization, the unreacted monomers are removed by vacuum, yielding 2.1 g of polymer.

EXAMPLE 4

Copolymerization of n-Butyl Acrylate and Hydroxyethyl acrylate with Iron(II) 10 1,3-Bis(2-Mesitylimino)isoindoline Complex and Mao Activator The general procedure of Example 1 is followed. A reactor tube (10 mL) is charged with n-butyl acrylate (2 mL), hydroxyethyl acrylate (2 mL), tri-isobutyl aluminum (0.1 mL, 1.0 M hexane solution), MAO (0.08 mL, 1.0 M toluene solution), and the catalyst complex (0.2 mL, 1.0 mg/ml toluene solution). The reactor tube is then sealed. The reactor contents are heated to 100° C. The polymerization continues at this temperature reading for about 1 h. After polymerization, the unreacted monomers are removed by vacuum, yielding 3.4 g of polymer.

EXAMPLE 5

Copolymerization of Ethylene, Styrene, and Allyl Monopropoxylate with Iron(II) 1,3-Bis(2-Mesitylimino)isoindoline Complex and Mao Activator The general procedure of Example 1 is followed. A reactor tube (10 mL) is charged with styrene (2 mL), allyl monopropoxylate (2 mL), tri-isobutyl aluminum (0.1 mL, 1.0 M hexane solution), MAO (0.08 mL, 1.0 M toluene solution), and the catalyst complex (0.2 mL, 1.0 mg/ml toluene solution). The reactor tube is then sealed. The reactor is pressured with ethylene to 400 psig and heated to 100° C. The polymerization continues at these temperature and pressure readings for about 1 h with continuous feeding of ethylene. The ethylene consumption is about 0.01 g. After polymerization, the unreacted monomers are removed by vacuum, yielding 0.23 g of polymer.

EXAMPLE 6

Copolymerization of Styrene and Allyl Monopropoxylate with Iron(II) 1,3-Bis(2-Mesitylimino)isoindoline Complex and Mao Activator The general procedure of Example 1 is followed. A reactor tube (10 mL) is charged with styrene (2 mL), allyl monopropoxylate (2 mL), tri-isobutyl aluminum (0.1 mL, 1.0 M hexane solution), MAO (0.08 mL, 1.0 M toluene solution), and the catalyst (0.2 mL, 1.0 mg/ml toluene solution). The reactor tube is then sealed. The reactor contents are heated to 100° C. The polymerization continues at this temperature reading for about 1 h. After polymerization, the unreacted monomers are removed by vacuum, yielding 0.1 g of polymer.

EXAMPLE 7

Copolymerization of Ethylene, n-Butyl Acrylate and Allyl Monopropoxylate with Iron(II) 1,3-Bis(2-pyridylimino)isoindoline Complex and MAO Activator Catalyst Preparation A 100-mL round-bottom flask equipped with a nitrogen inlet and an internal fritted-glass filter is charged with phthalimide (2.94 g, 20.0 mmol) and ethyl acetate (50 mL). 2-Aminopyridine (3.77 g, 40.0 mmol, 2.1 eq.) and iron(II) chloride (2.54 g, 20.0 mmol) are added to the flask, and the mixture is stirred under nitrogen at room temperature for 1 h. The mixture is stirred at room temperature for 120 h, yielding a white precipitate. After washing with cold diethyl ether (3×20 mL), the white solids are dried under vacuum for 1 h.

Polymerization

The polymerization procedure of Example 1 is followed, but the above prepared catalyst complex is used. The ethylene consumption is 0.01 g, and 0.15 g of polymer is collected.

EXAMPLE 8

Copolymerization of Ethylene, n-Butyl Acrylate, and Allyl Monopropoxylate with Iron(II) Bis(imine) Complex and MAO Activator Catalyst Preparation An iron(II) bis(imine) complex is prepared according Example 1 of U.S. Pat. No. 6,562,973. A 100 mL round-bottom flask equipped with a nitrogen inlet and an internal fritted-glass filter is charged with 2,6-diacetylpyridine (2.00 g, 12.2 mmol) and ethyl acetate (50 mL). 2,4,6-Trimethylaniline (3.52 g, 26.0 mmol, 2.13 eq.) is added to the stirred solution.

Iron(II) chloride (1.55 g, 12.2 mmol) is added to the flask, and the mixture is stirred under nitrogen at room temperature for 42 h. The reaction mixture is concentrated by stripping out solvents under reduced pressure. Cold diethyl ether (30 mL) is added to the residue, and the mixture is stirred to wash the residue. The glass filter is immersed in the liquid phase, which is then removed at reduced pressure through the internal filter. The complex solids are dried under vacuum for 1 h.

Polymerization

The polymerization procedure of Example 1 is followed, but the above prepared catalyst complex is used. The ethylene consumption is 0.01 g and 0.17 g of polymer is collected. The polymer has Mw: 6000; and Mn:2170; and MW/Mn: 2.76

We claim:

1. A process comprising polymerizing, in the presence of a Group 8–10 metal complex and an activator, one of the monomer groups (a) through (f):
    (a) a vinyl monomer selected from the group consisting of vinyl aromatics, vinyl ethers, vinyl esters, and vinyl halides thereof;
    (b) a vinyl monomer selected from the group consisting of vinyl ethers, vinyl esters, and vinyl halides, and at least one olefin;

(c) a hydroxy-functional monomer selected from the group consisting of hydroxyalkyl acrylates, hydroxyalkyl methacrylates, allylic alcohols, and alkoxylated allylic alcohols, and at least one alkyl or aryl acrylate or at least one alkyl or aryl methacrylate;

(d) a hydroxy-functional monomer selected from the group consisting of hydroxyalkyl acrylates, hydroxyalkyl methacrylates, allylic alcohols, and alkoxylated allylic alcohols, at least one alkyl or aryl acrylate or at least one alkyl or aryl methacrylate, and at least one olefin;

(e) a hydroxy-functional monomer selected from the group consisting of hydroxyalkyl acrylates, hydroxyalkyl methacrylates, allylic alcohols, and alkoxylated allylic alcohols, and at least one vinyl aromatic monomer; or (f) a hydroxy-functional monomer selected from the group consisting of hydroxyalkyl acrylates, hydroxyalkyl methacrylates, allylic alcohols, and alkoxylated allylic alcohols, at least one vinyl aromatic monomer, and at least one olefin;

wherein the complex has the general structure:

$$LM(X)_n$$

wherein M is a Group 8–10 metal; L is a polymerization-stable ligand selected from isoindolines or bis(imines); X is a labile ligand; and n is greater than or equal to 1; and wherein L is an isoindoline ligand having the general structure:

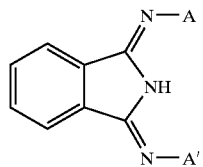

wherein A and A' are the same or different aryl or heteraryl groups.

2. The process of claim 1 wherein A and A' are identical aryl groups.

3. The process of claim 1 wherein A and A' are identical heteroaryl groups.

4. The process of claim 1 wherein the M is Fe and L is a 1,3-bis(2-mesitylimino)isoindoline or a 1,3-bis(2-pyridylimino)isoindoline.

5. The process of claim 1 wherein the activator is selected from the group consisting of alkyl alumoxanes, alkylaluminum compounds, aluminoboronates, organoboranes, ionic borates, and ionic aluminates.

6. A process which comprises polymerizing, in the presence of a Group 8–10 metal complex and an activator, a hydroxy-functional monomer selected from the group consisting of hydroxyalkyl acrylates, hydroxyalkyl methacrylates, allylic alcohols, and alkoxylated allylic alcohols, at least one alkyl or aryl acrylate or at least one alkyl or aryl methacrylate, optionally a vinyl aromatic monomer, and optionally a $C_{2-10}$ α-olefin; wherein the late transition metal complex comprises Fe and a 1,3-bis(2-mesitylimino)isoindoline or a 1,3-bis(2-pyridylimino) isoindoline ligand.

7. The process of claim 6 wherein the hydroxy-functional monomer is selected from the group consisting of hydroxyethyl acrylate, hydroxypropyl acrylate, hydroxyethyl methacrylate, hydroxypropyl methacrylate, hydroxybutyl acrylate, hydroxybutyl methacrylate, allyl alcohol, methallyl alcohol, propoxylated allyl alcohol, and ethoxylated allyl alcohol.

8. The process of claim 6 wherein at least one of the alkyl or aryl acrylate, or the alkyl or aryl methacrylate, is selected from the group consisting of n-butyl acrylate, n-butyl methacrylate, 2-ethylhexyl acrylate, 2-ethylhexyl methacrylate, methyl acrylate, methyl methacrylate, t-butyl acrylate, t-butyl methacrylate, iso-butyl acrylate, iso-butyl methacrylate, iso-bornyl acrylate, and iso-bornyl methacrylate.

9. The process of claim 6 wherein the hydroxy-functional monomer is allyl monopropoxylate and the alkyl acrylate or methacrylate is n-butyl acrylate or n-butyl methacrylate.

10. The process of claim 6 wherein the vinyl aromatic monomer is selected from the group consisting of styrene, α-methyl styrene, p-methyl styrene, and p-t-butyl styrene.

11. The process of claim 6 wherein the α-olefin is selected from the group consisting of ethylene, propylene, 1-butene, 1-pentene, 1-hexene, and 1-octene.

12. The process of claim 6 wherein the activator is an alkyl alumoxane.

13. A process which comprises polymerizing, in the presence of a Group 8–10 metal complex and an activator, at least one vinyl ester and at least one $C_{2-10}$ α-olefin.

14. The process of claim 13 wherein the vinyl ester is vinyl acetate and the α-olefin is ethylene.

15. A process which comprises polymerizing, in the presence of a Group 8–10 metal complex and an activator, a hydroxy-functional monomer selected from the group consisting of hydroxyalkyl acrylates, hydroxyalkyl methacrylates, allylic alcohols, and alkoxylated allylic alcohols, at least one vinyl aromatic monomer, and optionally at least one $C_{2-10}$ α-olefin.

16. The process of claim 15 wherein the vinyl aromatic monomer is styrene and the hydroxy-functional monomer is selected from the group consisting of allyl alcohol, methallyl alcohol, alkoxylated allyl alcohol, and alkoxylated methallyl alcohol.

* * * * *